United States Patent [19]

Petkovic et al.

[11] Patent Number: 5,044,089
[45] Date of Patent: Sep. 3, 1991

[54] POWER-OPERATED MEASURING TAPE

[76] Inventors: Andjelko Petkovic, 711 Napoleon St., Valparaiso, Ind. 46383; George Pejoski, 1125 Devonshire St., Hobart, Ind. 46342

[21] Appl. No.: 599,400

[22] Filed: Oct. 18, 1990

[51] Int. Cl.⁵ .................................................. G01B 3/10
[52] U.S. Cl. ........................................ 33/755; 33/767; 33/763; 242/84.8
[58] Field of Search .................. 33/755, 759, 760–764, 33/767; 242/84.8

[56] References Cited

U.S. PATENT DOCUMENTS

| | | | |
|---|---|---|---|
| 2,992,487 | 7/1961 | Miller | 33/760 |
| 3,473,751 | 10/1969 | Quenot | 242/84.8 |
| 4,186,490 | 2/1980 | Quenot | 33/762 |
| 4,189,107 | 2/1980 | Quenot et al. | 33/761 |
| 4,449,302 | 5/1984 | Drechsler et al. | 242/84.8 |
| 4,527,334 | 7/1985 | Jones et al. | 33/761 |
| 4,532,709 | 8/1985 | Leumann et al. | 33/763 |
| 4,551,847 | 11/1985 | Caldwell | 33/755 |
| 4,765,063 | 8/1988 | Sing | 33/755 |
| 4,945,650 | 8/1990 | Hird | 33/763 |

FOREIGN PATENT DOCUMENTS

| | | | |
|---|---|---|---|
| 2658580 | 6/1978 | Fed. Rep. of Germany | 33/762 |
| 2614982 | 11/1988 | France | 33/763 |
| 1192683 | 5/1970 | United Kingdom | 242/84.8 |

Primary Examiner—William A. Cuchlinski, Jr.
Assistant Examiner—Alvin Wirthlin

[57] ABSTRACT

A measuring device in which a flexible steel measuring tape is wound around a spool within a housing. A motor-powered sprocket wheel has teeth engaged with openings spaced along the tape for extending the tape out of the housing. A separate electric motor is connected to the spool for drawing the tape back into the housing and onto the spool. A manual operator is connected with two switches for controlling the two motors.

2 Claims, 1 Drawing Sheet

POWER-OPERATED MEASURING TAPE

BACKGROUND AND SUMMARY OF THE INVENTION

This invention relates to a measuring device of the type wherein a flexible metal measuring tape is spirally wound on a rotary spool within a tape housing. The measuring tape can be unwound from the spool for extension out of the housing for performance of a distance measuring function. Distance increments related to tape movement can be read from calibrated markings spaced along the tape. Alternately, the distance increments can be provided by a digital display on the tape housing. In this latter case an electronic counting means can be located within the housing to automatically read incremental motion of the spool or other component associated with tape movement.

The present invention relates to power mechanisms for extending or retracting the metal tape out of or into the housing without manual effort. The power mechanism preferably includes two separate electric motors. One of the motors is arranged to drive a sprocket wheel that has teeth drivingly engaged with evenly-spaced openings extending along the length of the tape. When the motor is energized the sprocket is rotated to pull the tape off the spool on which it is wound; portions of the tape are thereby moved out of the housing. The second motor is connected directly to the spool on which the tape is wound. When the second motor is energized the spool is rotated to pull the tape back onto the spool.

The use of two motors for extending or retracting the tape is believed to be new in the art. It is already known to use a single reversible motor in operative connection to a tape-supporting spool, as in U.S. Pat. No. 4,551,847 issued to W. K. Caldwell. When two separate motors are used one motor can operate a sprocket wheel that applies a pulling motion on the tape to draw it off the spool; the other motor can rotate spool to pull the tape back onto the spool. In both cases the tape is subjected to a pulling motion.

When a single reversible motor is used the tape-unwinding drive force is applied through the spool and wound-up portion of the spool, such that the tape is pushed off the spool. The flexible tape is not well suited to exert such a pushing force. Therefore the tape movement process can be somewhat inefficient and erratic.

Another advantage of using two motors is that the tape-unwind velocity is substantially constant; it does not change as the diameter of the tape on the support spool decreases. The motor-operated sprocket wheel pulls the tape from the support spool so that tape velocity is related to sprocket wheel rotational velocity, which is essentially constant.

In preferred practice of the invention the two electric motors are controlled by a single switch operator. Manual motion of the operator in one direction engerizes one of the motors. Manual motion of the operator in the opposite direction energizes the other motor. When the manual operator is in an intermediate position both motors are de-energized. A friction brake means can be associated with the tape to hold the tape against inadvertent movement (slippage) when the manual operator is in its intermediate position. The mechanism is designed so that it can be operated with one hand while the tape is being extended or retracted.

THE DRAWINGS

DESCRIPTION OF A PREFERRED EMBODIMENT OF THE INVENTION

Figure 1:
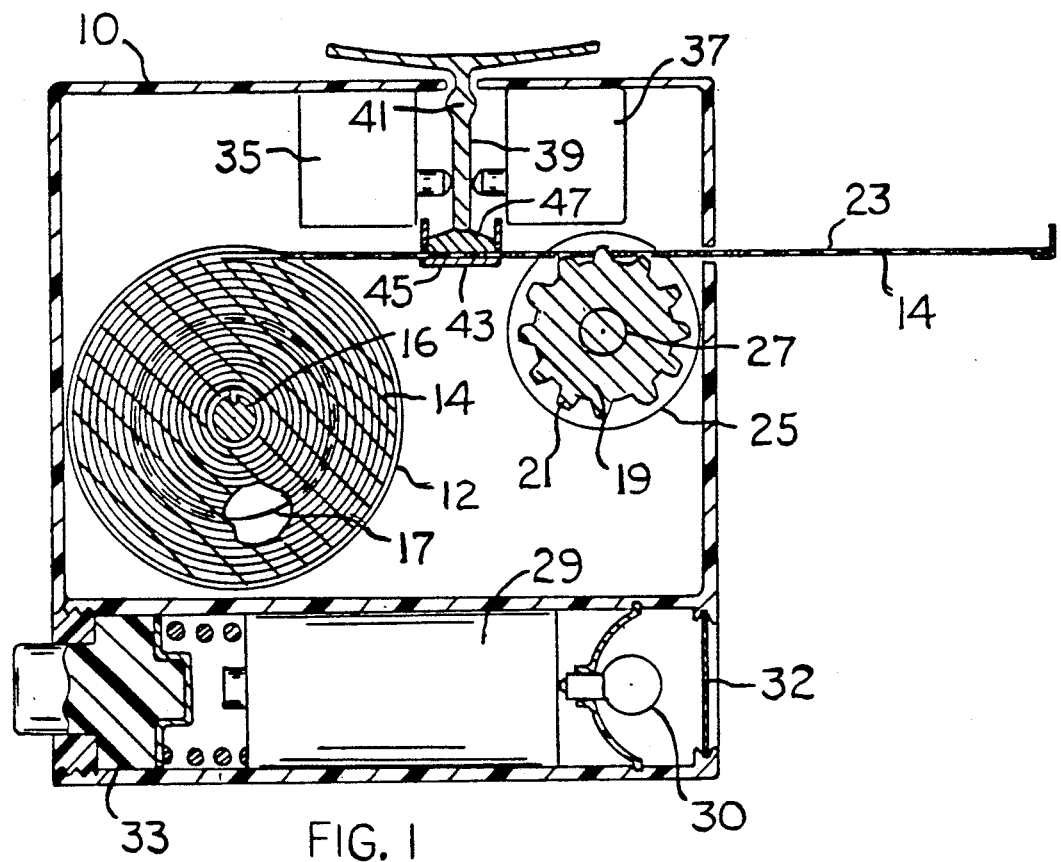
FIG. 1 is a sectional view taken through a measuring device embodying the invention.

FIG. 1 shows a measuring device that includes a housing 10 containing a rotary spool 12, on which is spirally wound a flexible metal measuring tape 14. The shaft 16 of the spool is connected to the drive shaft of an electric motor 17 that is located directly behind the spool in FIG. 1. When motor 17 is energized the spool will rotate in a counterclockwise direction, thereby drawing tape 14 onto the spool.

Located alongside spool 12 is a rotary sprocket wheel 19 having radially-projecting teeth 21. Metal tape 14 has a multiplicity of openings 23 spaced therealong for engagement with the sprocket wheel teeth 21. A second electric motor 25 has its drive shaft 27 connected to sprocket wheel 19 so that when motor 25 is energized the sprocket wheel rotates in a clockwise direction to pull tape 14 off of spool 12; portions of the tape will then project outside housing 10 to enable the user to make distance measurements. The two motors 25 and 17 will be operated at different times to extend or retract tape 14.

Power for motors 17 and 25 is provided by a number of dry cell batteries located in the lower portion of housing 10; such batteries are not visible in FIG. 1, but would be located behind battery 29. Battery 29 is used to power a light bulb 30 located within housing 10 in registry with a plastic transparent window 32. A push button switch 33 may be slidably arranged within the housing to complete the circuit through battery 29 and bulb 30. When manual pressure on switch 33 is released the bulb goes dark.

The non-illustrated batteries are connected to motor 17 and 25 through separate normally-open micro-switches 35 and 37 arranged in the upper portion of housing 10. One of the switches is connected in circuit between the dry cell batteries and motor 17. The other switch is connected in circuit between the batteries and motor 25. A manual operator 39 is located between the two switches for swinging motion around a pivot axis 41. When the operator is swung in one direction switch 35 is closed to energize one of the motors; when the operator is swung in the opposite direction switch 37 is closed to energize the other motor. In the absence of manual pressure on operator 39 spring mechanisms within the switch housings will project the switch plungers against opposite faces of operator 39, thereby biasing the operator to a centered intermediate position wherein neither motor is energized. FIG. 1 shows operator 39 in its intermediate centered position.

A friction brake means 43 is located in the space between spool 12 and sprocket wheel 19 to grip tape 14 when manual operator 39 is in its intermediate position. The brake means is shown as a stationary channel 45 having transverse slots for passage of the tape. A pad 47 is floatably arranged in the channel above the tape. Pad 47 has an upper surface contour, such that a cam-type drive connection is established between manual operator 39 and the brake pad.

When operator 39 is in its intermediate position the lower end of the operator presses pad 47 downwardly against tape 14, thereby preventing the tape from moving in either direction. When operator 39 is swung in either direction pad 47 is free to float above the tape, such that the tape is free to be moved by motor 17 or 25 (depending on the direction in which operator 39 is moved). A lifter spring (not shown) could be associated with pad 47 to minimize friction between the pad and tape 14.

The device of FIG. 1 is designed to be operated by one hand. Typically the person's hand will encircle housing 10, with the thumb or first finger free to exert pressure on the exposed portion of manual operator 39. When pressure on operator 39 is released the operator will assume a centered position in which the tape is locked in a fixed position by brake means 43.

Figure 2:
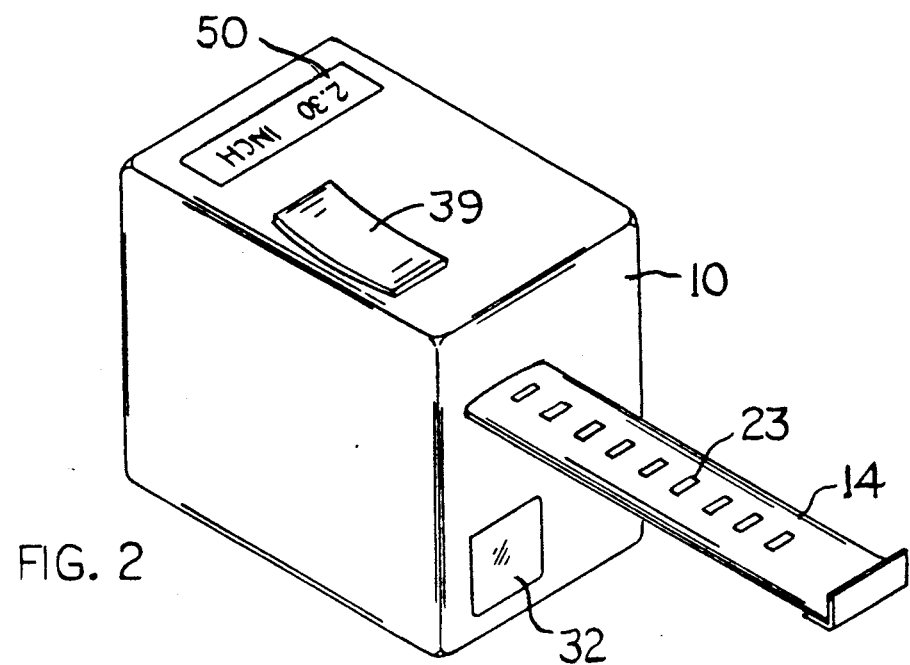
FIG. 2 is a perspective view of another measuring device utilizing the invention.

Tape 14 can have graduated markings therealong for readout of the distance being measured by the tape. Alternately the distance may be a digital readout on one face of housing 10, as shown at 50 in FIG. 2. In the FIG. 2 device the tape movement mechanism is the same as the mechanism used in FIG. 1. However, an electronic counting mechanism is added into the FIG. 2 device to electronically measure the projected length of tape 14. U.S. Pat. No. 4,551,847 shows one counting mechanism that can be used. Another operable counting mechanism is depicted in U.S. Pat. No. 3,838,518 issued to P. Hendrickson. The counting mechanism can respond to tape movement or rotary motion of sprocket wheel 19 or spool 12.

The present invention is concerned especially with the system of motors used to extend or retract the tape from the housing. The preferred mechanism comprises two separate motors. However, one of the motors could be replaced by a multi-convolution leaf spring, as shown in U.S. Pat. No. 4,527,334 issued to H. S. Jones et al. For example, a multi-convolution leaf spring could be located directly behind spool 12 (FIG. 1), with the inner end thereof connected to shaft 16 and the outer end thereof connected to housing 10. The leaf spring would be used to rotate spool 12 for drawing tape 14 onto the spool. Motor 25 and sprocket wheel 19 would be used to draw the tape off of the spool.

What is claimed is:

1. A measuring device, comprising: a housing; a spool rotatably mounted within said housing; a flexible measuring tape wound spirally on said spool for extension out of the housing or retraction into the housing; said tape having a plurality of evenly-spaced openings therealong; a sprocket wheel rotatably mounted within said housing, said sprocket wheel having evenly-spaced teeth extending into said tape openings whereby rotation of the sprocket wheel around its axis is effective to pull the tape off the spool and out of the housing; a first electric motor connected to the sprocket wheel for driving the sprocket wheel in the direction that will cause the tape to be pulled off of the spool; a second electric motor connected to the spool for rotating the spool in the direction that will cause the tape to be drawn onto the spool; a first switch means for energizing said first motor; a second switch means for energizing said second motor; said first and second switch means having opposed spaced operating plungers; and a manual operator (39) having an actuator portion located between the switch means plungers and a pivot axis for swinging said actuator portion in opposite directions, so that when the manual operator is swung in one direction the first switch means is operated to energize the first motor, and when the manual operator is swung in the other direction the second switch means is operated to energize the second motor.

2. The measuring device of claim 1, and further comprising a friction brake means effective to grip the tape to prevent tape movement into or out of the housing; and a drive connection between said manual operator and said friction brake means, whereby the tape is prevented from movement only when the actuator portion of said manual operator is in a centered position between the two switch means.

* * * * *